United States Patent
Fujisawa et al.

(10) Patent No.: US 7,021,794 B2
(45) Date of Patent: Apr. 4, 2006

(54) LIGHTING UNIT AND PROJECTOR INCLUDING THE SAME

(75) Inventors: Shohei Fujisawa, Matsumoto (JP); Takeshi Takezawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 112 days.

(21) Appl. No.: 10/855,411

(22) Filed: May 28, 2004

(65) Prior Publication Data

US 2005/0041429 A1   Feb. 24, 2005

(30) Foreign Application Priority Data

Jun. 5, 2003   (JP)   ............................... 2003-160842

(51) Int. Cl.
*F21V 7/00*   (2006.01)
(52) U.S. Cl. .................. 362/268; 362/328; 353/31; 349/5
(58) Field of Classification Search ................ 362/268, 362/328, 551; 353/31; 349/5
See application file for complete search history.

(56) References Cited

U.S. PATENT DOCUMENTS 6,688,756 B1 * 2/2004 Akiyama .................... 362/268

FOREIGN PATENT DOCUMENTS

| JP | A 2-195319 | 8/1990 |
|---|---|---|
| JP | A 9-120067 | 5/1997 |
| JP | A 10-288757 | 10/1998 |
| JP | 2000-347293 | 12/2000 |
| JP | A 2001-109068 | 4/2001 |
| JP | A 2002-350778 | 12/2002 |

* cited by examiner

*Primary Examiner*—Sandra O'Shea
*Assistant Examiner*—James W Cranson, Jr.
(74) *Attorney, Agent, or Firm*—Oliff & Berridge, PLC

(57) ABSTRACT

A lighting unit including a light source lamp having a light emitting tube and an ellipsoid reflector, and an optical lens to parallelize illumination light released from the reflector, characterized in that:

a first focal point P1, which is one of the two focal points P1 and P2 positioned inside and outside the reflector and is located on the side of the reflecting surface of the reflector, is contained within the light emitting tube, and a light emission center Q of the light emitting tube is offset in a virtual plane perpendicular to a reflector central axis OC; and a parallelizing lens has a lens optical axis on a reference axis L parallel to the reflector central axis OC, and the lens optical axis of the parallelizing lens is offset in a direction opposite to a direction where the emission center Q of the light emitting tube is offset from the reflector central axis OC.

11 Claims, 5 Drawing Sheets

LIGHTING UNIT AND PROJECTOR INCLUDING THE SAME

BACKGROUND OF THE INVENTION

1. Field of Invention

The present invention relates to a lighting unit and a projector including the same.

2. Description of Related Art

Figure 5:
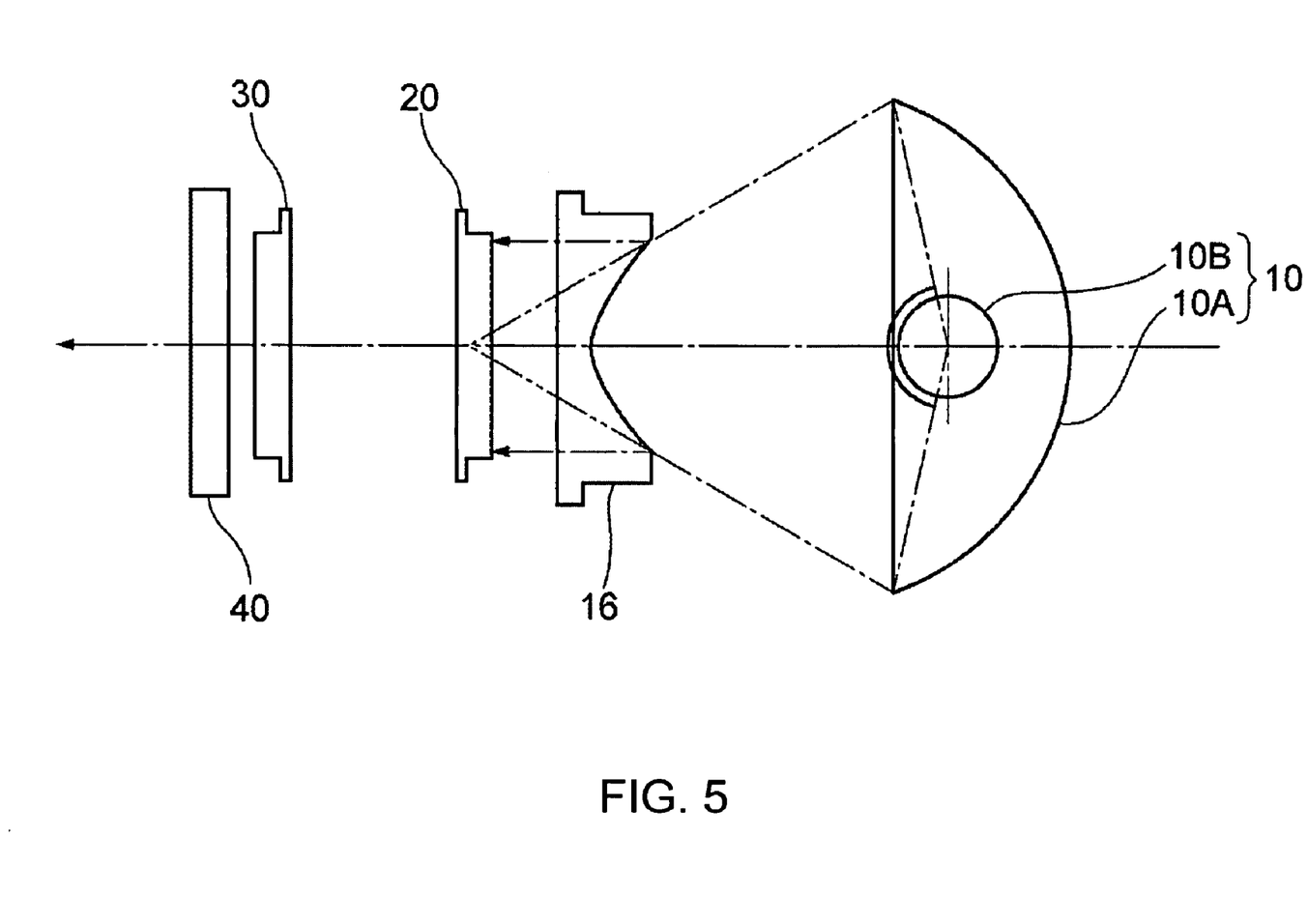
FIG. 5 is a schematic illustrating a related art lighting unit including an ellipsoid reflector.

FIG. 5 is a schematic showing a lighting unit which contains a reflector formed from an ellipsoidal mirror (hereinafter "ellipsoid reflector"). As described in JP-A-2000-347293 (FIG. 1), for example, the lighting unit of this type includes: a light source lamp 10 having a light emitting tube 10B for emitting illumination light and an ellipsoid reflector 10A for reflecting the illumination light emitted from the light emitting tube 10B; and a parallelizing lens 16 for parallelizing the illumination light reflected by the ellipsoid reflector 10A of the light source lamp 10. In the figure, reference numerals 20 and 30 denote a pair of lens arrays, and a reference numeral 40 denotes a polarizing conversion element, respectively.

According to this related art lighting unit, the illumination light emitted from the light emitting tube 10B is reflected by the ellipsoid reflector 10A and then converted into almost parallel light by the parallelizing lens 16. In related art the lighting unit, the outside diameter of the light flux released from the parallelizing lens 16 can be made smaller than the outside diameter of the ellipsoid reflector, allowing the subsequent optical system to be made compact. Thus, the related art lighting unit of this type meets recent demand for miniaturization of projectors, which is significant in view of current situation where further miniaturization of a light source lamp is difficult because of the difficulty in miniaturization of a light emitting tube.

In recent years, there has been also increasing demand for thinner projectors as well as small-sized ones.

SUMMARY OF THE INVENTION

However, in case of the above-described related art lighting unit, respective optical elements which are made compact as a result of convergence of the light flux by the ellipsoid reflector, are disposed in such positions that their central axes are set at the optical axis of the reflector. Accordingly, the space produced as a result of miniaturization of each optical element exists in an area surrounding the element. Thus it is impossible to obtain a sufficiently wide space in any surrounding area. When a thinner housing is provided for a projector so as to make it compact, it is difficult to accommodate relatively large components, such as a circuit board and a power source, only in the spaces surrounding the respective optical elements described above. Therefore, a thinner projector cannot be provided with ease.

Accordingly, an exemplary aspect of the present invention provides a lighting unit employed to make a projector thinner and to provide a projector including the lighting unit.

A lighting unit according to an exemplary aspect of the present invention includes: a light source lamp having a light emitting tube to emit illumination light and an ellipsoid reflector to reflect the illumination light emitted from the light emitting tube to release the illumination light in a fixed direction; and a parallelizing lens disposed on a side of a region to be lighted by the light source lamp to parallelize the illumination light released from said reflector. In the lighting unit the reflector includes a first focal point positioned inside a reflecting surface of the reflector, a second focal point positioned outside the reflecting surface of the reflector, and a reflector central axis on which the first and second focal points are positioned. The light emitting tube contains the first focal point within the light emitting tube, and a light emission center of the light emitting tube is offset from the first focal point in a virtual plane perpendicular to the reflector central axis. The parallelizing lens includes a lens optical axis parallel to the reflector central axis, and the lens optical axis is offset from the reflector central axis in a direction opposite to a direction where the light emission center of the light emitting tube is offset from the first focal point of the reflector.

According to the lighting unit of an exemplary aspect of the invention, the reference axis for the respective optical elements in the optical path after the parallelizing lens is offset from the reflector central axis by offsetting the light emission center of the light emitting tube from the reflector central axis and thus offsetting the lens optical axis of the parallelizing lens from the reflector central axis. As a result, a large space can be obtained in a region positioned in a direction opposite to a direction where the respective optical elements in the optical path after the parallelizing lens are offset from the reflector central axis.

Thus, relatively large components, such as a circuit board and a power source, can be disposed adequately and efficiently in this space, making a projector thinner.

In the lighting unit of an exemplary aspect the invention, a ratio of an offset value a of the lens optical axis of the parallelizing lens from the reflector central axis to an offset value b of the light emission center of the light emitting tube from the reflector central axis, i.e., an a/b ratio may be established as to be equal to a ratio of an optical distance f2 from a point at which the reflector ellipsoid and the reflector central axis cross each other to the second focal point to an optical distance f1 from the point to the first focal point, i.e., a f2/f1 ratio.

In the lighting unit of an exemplary aspect of the invention, since the ratio of the offset value a of the lens optical axis of the parallelizing lens from the reflector central axis to the offset value b of the light emission center of the light emitting tube from the reflector central axis, i.e., the a/b ratio is established according to the ratio of the optical distance f2 from the point at which the reflector ellipsoid and the reflector central axis cross each other to the second focal point to the optical distance f1 from that point to the first focal point, i.e., the f2/f1 ratio, these parameters can be easily determined and thus the system design can be simplified.

In the lighting unit of an exemplary aspect of the invention, an end of the reflector and an end of the parallelizing lens positioned in the direction opposite to the direction where the light emission center of the light emitting tube is offset from the first focal point of the reflector may be disposed on the same virtual line parallel to the reflector central axis.

According to an exemplary aspect of the invention, a sufficiently large space can be obtained in a certain single region in any of the directions perpendicular to the reflector central axis. Thus, relatively large components, such as a circuit board and a power source can be disposed adequately and efficiently in this space, allowing the projector to be made thinner.

In the lighting unit of an exemplary aspect of the invention, the light emission center of the light emitting tube and the lens optical axis of the parallelizing lens may be offset in an up-down direction perpendicular to the reflector central axis.

According to an exemplary aspect of the invention, a region in the direction opposite to the direction where the respective optical elements in the optical path after the parallelizing lens are offset from the reflector central axis becomes still larger in the vertical direction. Thus, relatively large components, such as a circuit board and a power source can be disposed more efficiently in this wide space, allowing the projector to be made further thinner.

In the lighting unit of an exemplary aspect of the invention, the light emission center of the light emitting tube and the lens optical axis of the parallelizing lens may be offset in a left-right direction horizontal to the reflector central axis.

According to an exemplary aspect of the invention, a sufficiently large space can be obtained in a certain single region in any of the left-right directions horizontal to the reflector optical axis. Thus, relatively large components, such as a circuit board and a power source can be disposed adequately and efficiently in this space, allowing the projector to be made further thinner and compact.

The projector provided according to an exemplary aspect of the invention modulates illumination light emitted from a lighting unit in accordance with image information to form optical images and projects the enlarged images. The projector is characterized in that the lighting unit is a lighting unit described in any of the preceding exemplary aspects of the invention.

According to the projector of an exemplary aspect of the invention, a projector having similar operations and advantages to those as described above is provided. The reference axis for the respective optical elements in the optical path after the parallelizing lens is offset from the reflector central axis by offsetting the light emission center of the light emitting tube from the reflector central axis and thus offsetting the lens optical axis of the parallelizing lens from the reflector central axis. As a result, a large space can be obtained in a region positioned in the direction opposite to the direction where the respective optical elements in the optical path after the parallelizing lens are offset from the reflector central axis.

Thus, relatively large components, such as a circuit board and a power source can be disposed adequately and efficiently in this space, allowing the entire structure of the projector to be made thinner.

In the projector of the an exemplary aspect of invention, the optical components in the optical path after the parallelizing lens may be disposed in such positions that acquisition efficiency of the light reflected by the reflector becomes the highest.

According to the projector of an exemplary aspect of the invention, including the optical system in which the light emission center of the light emitting tube and the reference axis for the optical components which axis coincides with the lens optical axis of the parallelizing lens are offset in the direction perpendicular to the reflector central axis, the maximum utilization efficiency of illumination light can be obtained.

DETAILED DESCRIPTION OF EXEMPLARY EMBODIMENTS

Exemplary embodiments according of the present invention are hereinafter described in conjunction with the drawings.

Figures 1A, 1B:
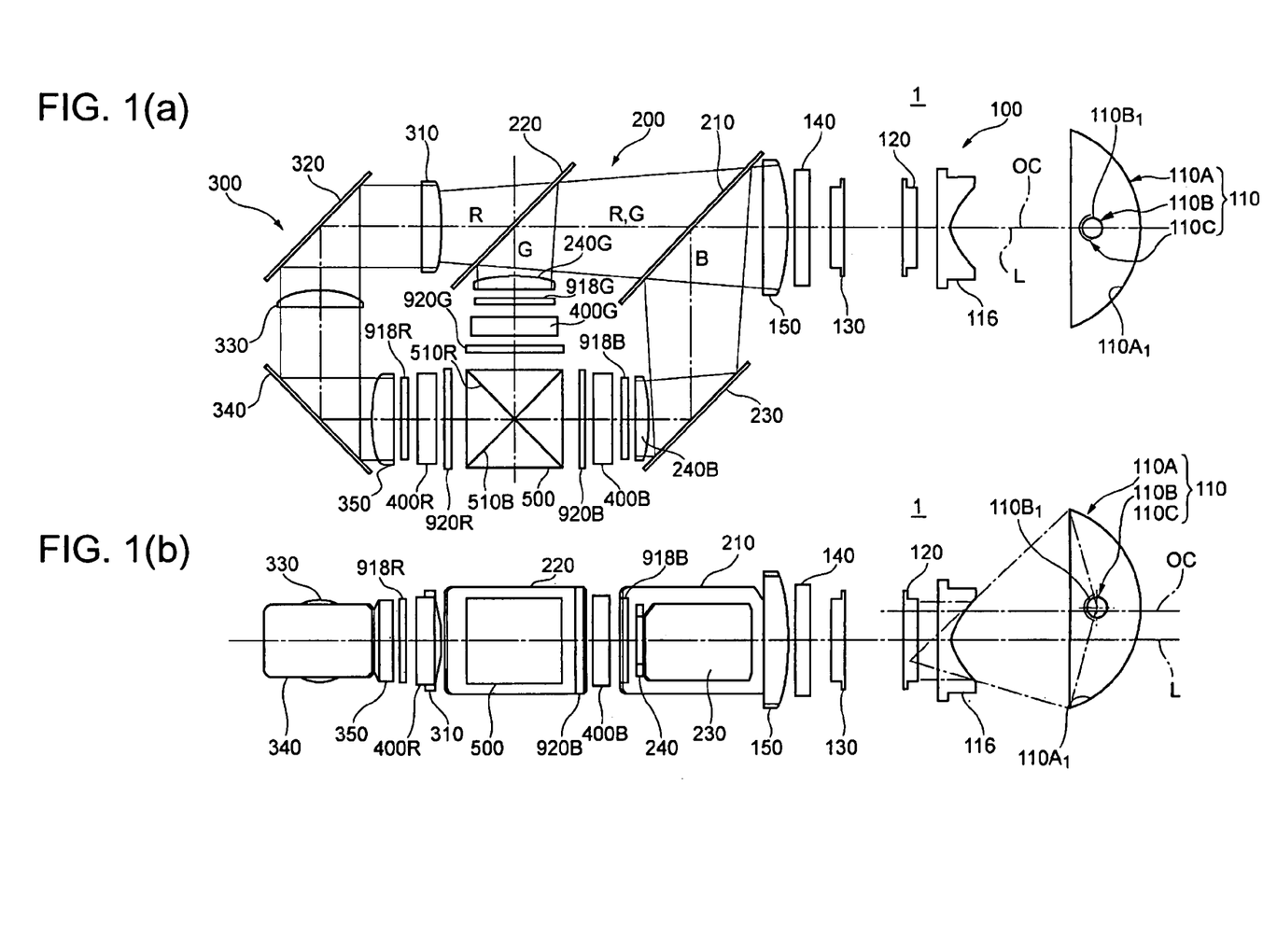
FIGS. 1(a) and 1(b) are schematics showing an optical system of a projector in a first exemplary embodiment according to the present invention.
Figure 2:
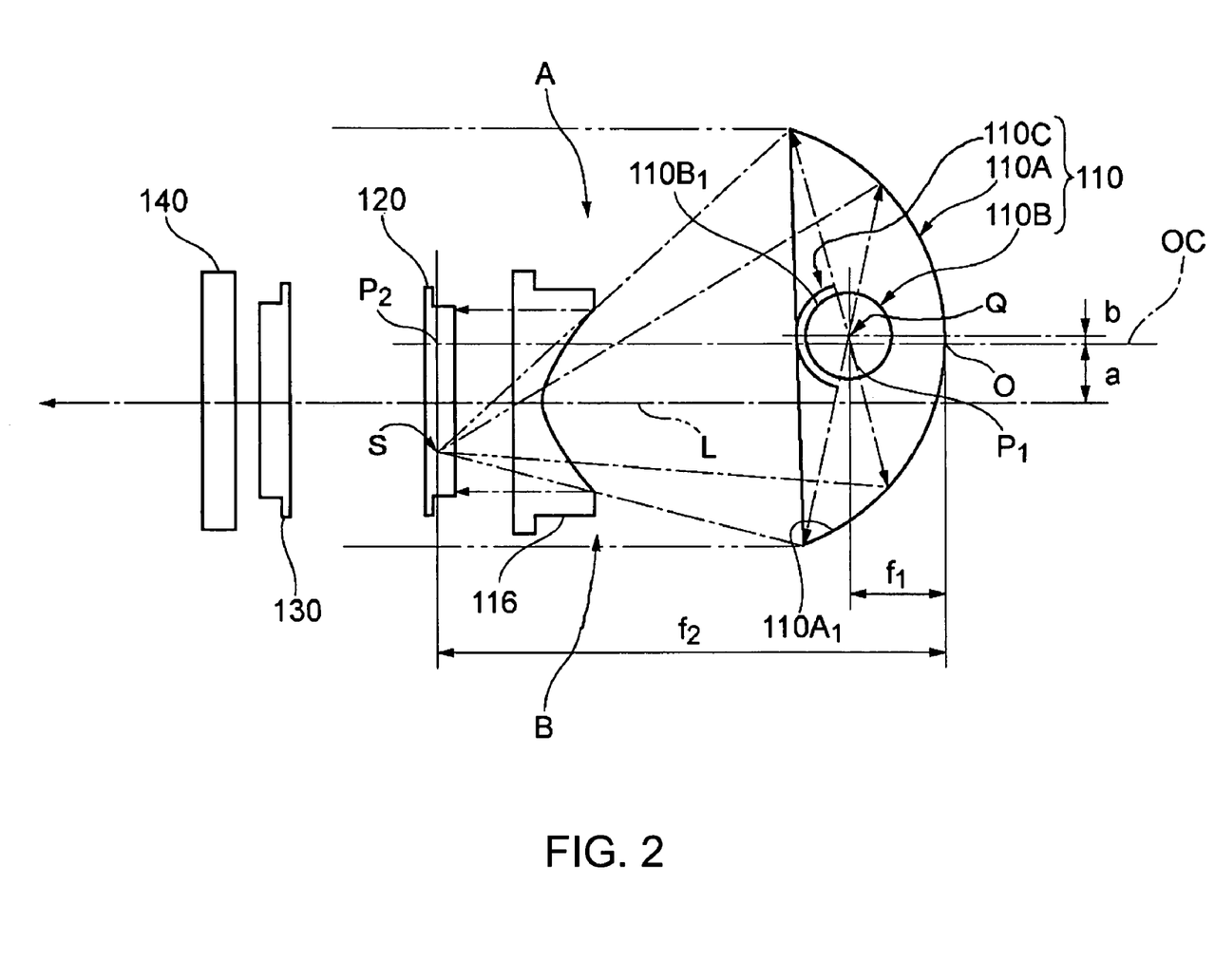
FIG. 2 is a schematic showing a lighting unit in the first exemplary embodiment according to the invention.

A first exemplary embodiment of the invention is explained referring to FIGS. 1(a)–(b) and 2.

Exemplary Embodiment 1

FIGS. 1(a) and 1(b) are schematics illustrating an optical system of a projector in the first exemplary embodiment according to the invention. FIG. 1(a) is a plan view, and FIG. 1(b) is a side view of the optical system.

As illustrated in FIG. 1, a projector to which reference number 1 is given includes a lighting unit 100, a color separation optical system 200, a relay optical system 300, an optical unit 400, a cross dichroic prism 500, and a projection optical system (not shown). Constituents of each optical system extend almost horizontally from a center point positioned at the cross dichroic prism 500. Optical elements constituting the optical systems 100 through 300 are appropriately positioned and accommodated in an optical component housing having a predetermined reference axis L.

The lighting unit 100 includes a light source lamp 110, a parallelizing lens 116, a first lens array 120, a second lens array 130, a polarizing conversion element 140, and a superposing lens 150.

The light source lamp 110, which will be described in detail later, includes a reflector 110A, a light emitting tube 110B, and a subsidiary reflecting mirror 110C disposed opposite to the reflector 110A with the light emitting tube 110B interposed between the subsidiary reflecting mirror 110C and the reflector 110A.

The reflector 110A is an ellipsoidal mirror which is open to a region to be lighted and has a spheroidal surface symmetric with respect to a reflector central axis OC. A reflecting surface 110A1 is formed on the inside of the reflector 110A. A first focal point P1 of the reflector 110A is disposed inside the reflecting surface 110A1 of the reflector 110A, while a second focal point P2 thereof is positioned outside the reflector 110A. The first and second focal points P1 and P2 correspond to ellipse focuses of spheroidal surface of the reflecting surface 110A1 formed on the reflector 110A.

The parallelizing lens 116 parallelizes the light flux which is emitted from the light emitting tube 110B and reflected by the reflector 110A as convergent light.

The first lens array 120 is an optical dividing element to divide the light flux released from the parallelizing lens 116 into a plurality of partial light fluxes. The first lens array 120 includes a plurality of small lenses which are arranged in a matrix and formed on its surface extending perpendicular to the reference axis L. Each small lens has an outline almost similar to the shape of each image forming region of liquid crystal displays 400R, 400G and 400B which constitute the optical unit 400 to be described later.

The second lens array 130 is an optical element to converge a plurality of the partial light fluxes divided by the first lens array 120 as described above in cooperation with the superposing lens 150. Similarly to the first lens array 120, the second lens array 130 includes small lenses arranged in a matrix and formed on its surface extending perpendicular to the reference axis L. As the second lens array 130 is provided for the purpose of converging light fluxes, each small lens need not have an outline corresponding to the shape of each image forming region of the liquid crystal displays 400R, 400G and 400B.

The polarizing conversion element 140 has a function to direct polarization directions of the respective partial light fluxes divided by the first lens array 120 to such polarization directions as available in the liquid crystal displays 400R, 400G and 400B.

The superposing lens 150 is an optical element to converge a plurality of the partial light fluxes coming through the first lens array 120, the second lens array 130 and the polarizing conversion element 140 and superposing the converged light fluxes on lighting regions which are the image forming regions of the liquid crystal displays 400R, 400G and 400B.

The color separation optical system 200 includes a first dichroic mirror 210, a second dichroic mirror 220 and a reflecting mirror 230, and has a function to separate the illumination light emitted from the lighting unit 100 into three lights having different colors at different wavelength ranges. The first dichroic mirror 210 reflects substantially blue light (hereinafter "B light") and transmits substantially green light (hereinafter "G light") and substantially red light (hereinafter "R light"). The B light reflected by the first dichroic mirror 210 is again reflected by the reflecting mirror 230. The B light then passes through a field lens 240B and lights the liquid crystal display 400 B for the B light.

The field lens 240B is provided for the purpose of converting a plurality of the partial light fluxes emitted from the lighting unit 100 into light fluxes parallel to the reference axis L. Other field lenses 240G and 350 disposed in front of the liquid crystal displays 400G and 400R, respectively, have similar structures with the field lens 240B.

The G light, which passes through the first dichroic mirror 210 together with the R light, is reflected by the second dichroic mirror 220. The G light then passes through the field lens 240G and lights the liquid crystal display 400G for the G light. The R light passes through the second dichroic mirror 220 and the relay optical system 300, and lights the liquid crystal display 400R for the R light.

The relay optical system 300 includes an incidence-side lens 310, an incidence-side reflecting mirror 320, a relay lens 330, and an emission-side reflecting mirror 340. The R light released from the color separation optical system 200 is converged by the incidence-side lens 310 and the relay lens 330, bent by the incidence-side reflecting mirror 320 and the emission-side reflecting mirror 340, and enters the field lens 350. The relay optical system 300 is provided in the course of the R optical path so as to reduce or prevent lowering of light utilization efficiency due to light diffusion or other cause, which may be caused by the condition that the R light has a longer optical path than other lights in other colors. The relay optical system 300 is designed so that the light fluxes enter the field lens 350 in an amount substantially equal to the amount of the light fluxes entering the incidence-side lens 310. The relay optical system 300 herein transmits the R light among the three lights having different colors, but may transmit other light having other color, such as the B light.

The optical unit 400 includes the liquid crystal displays 400R, 400G and 400B, each for the corresponding color. The light in each color having entered a light incidence surface of the corresponding liquid crystal display is modulated according to the corresponding image information, and the modulated light is released as transmitted light. incidence-side polarizing plates 918R, 918G and 918B are positioned between the field lens 350, 240G and 240B and the incidence sides of the liquid crystal displays 400R, 400G and 400B, respectively, while emission-side polarizing plates 920R, 920G and 920B are positioned at the emission sides of the liquid crystal displays 400R, 400G and 400B, respectively. The light in each color having entered is light-modulated by the incidence-side polarizing plates 918R, 918G and 918B, the liquid crystal displays 400R, 400G and 400B, and the emission-side polarizing plates 920R, 920G and 920B. The liquid crystal displays 400R, 400G and 400B are transmission type liquid crystal displays, and are formed by closed-sealing liquid crystal as electro-optics material in a pair of light-transmissive glass substrates. The liquid crystal displays 400R, 400G and 400B, equipped with a switching element formed from polysilicone TFT or other material, modulates the polarization directions of the polarized light fluxes released from the incidence-side polarizing plates 918R, 918G and 918B in accordance with provided image signals.

The cross dichroic prism 500 has a function as a color synthesizing optical system which synthesizes the modulated lights in the respective colors released from the optical unit 400. The cross dichroic prism 500 is formed by combining four right-angled prisms to have a substantially square shape as viewed from the top. A dielectric multilayer film is provided on each attachment boundary between the right-angled prisms, forming an approximately X shape. One of the X-shaped boundaries is an R light reflecting dichroic surface 510R to reflect the R light which surface has a dielectric multilayer film capable of reflecting the R light, while the other of the X-shaped boundaries is a B light reflecting dichroic surface 510B to reflect the B light which surface has a dielectric multilayer film capable of reflecting the B light. Both of the reflecting dichroic surfaces 510R and 510B synthesize the three modulated lights in different colors to produce synthetic lights used to display color images. The synthetic lights produced at the cross dichroic prism 500 is released toward the projection optical system (not shown).

The projection optical system includes a plurality of lenses, and so designed as to provide enlarged projection display formed from the synthetic lights released from the cross dichroic prism 500 as display images on a screen (not shown).

FIG. 2 is a schematic illustrating the lighting unit 100 in the first exemplary embodiment according to the present invention. As illustrated in FIG. 2, the lighting unit 100 in the first exemplary embodiment includes the light source lamp 110, the parallelizing lens 116, the first lens array 120, the second lens array 130, the polarizing conversion element 140, and the superposing lens 150. Main components included in the light source lamp 110 are the light emitting tube 110B, the reflector 110A to reflect light flux emitted from the light emitting tube 110B to release the light flux in a fixed direction, and a subsidiary reflecting mirror 110C disposed opposite to the reflector 110A with the light emitting tube 110B interposed between the subsidiary reflecting mirror 110C and the reflector 110A.

The light emitting tube 110B may be selected from various types of light emitting tubes which have a glass tube 110B1 made of quartz glass releasing illumination light and emit light having high brightness. For example, a high pressure mercury lamp, an extra-high pressure mercury lamp, a xenon lamp and a metal halide lamp may be employed.

The reflector 110A is open to the region to be lighted, and includes the reflecting surface 101A1 which is formed from a spheroidal surface having the reflector central axis OC parallel to the reference axis L. The first focal point P1 and the second focal point P2 of the spheroidal surface are positioned on the reflector central axis OC. The reflecting surface 101A1 is a cold mirror formed by evaporating metal thin film to reflect visible light and transmit infrared and ultraviolet lights.

The light emitting tube 110B is accommodated inside the reflecting surface 101A1 of the reflector 110A such that the first focal point P1 of the reflector 110A is contained within the glass tube 110B1. A light emission center Q of the light emitting tube 110B is offset from the first focal point P1 of the reflector 110 upwardly in a virtual plane perpendicular to the reflector central axis OC. The offset value of the light emission center Q of the light emitting tube 110B in the direction perpendicular to the reflector central axis OC is set at an offset value b (shown in FIG. 2).

The subsidiary reflecting mirror 110C is a reflecting member which is disposed opposite to the reflector 110A with the light emitting tube 110B interposed therebetween to cover almost the front half of the light emitting tube 110B. The subsidiary reflecting mirror 110C is formed from a low thermal expansion and/or high thermal conduction inorganic material, such as quartz and alumina ceramics. The reflecting surface of the subsidiary reflecting mirror 110C has a concave curved surface, and is formed as a cold mirror like the reflector 110A.

The light flux going directly toward the reflector 110A among light fluxes emitted from the light emission center Q of the light emitting tube 110B is reflected by the reflecting surface 110A1 of the reflector 110A to become convergent light which converges at a spot S.

The light flux reflected by the subsidiary reflecting mirror 110C among light fluxes emitted from the light emission center Q of the light emitting tube 110B goes to the reflector 110A, and is again reflected by the reflecting surface 110A1 of the reflector 110A to become convergent light, which converges at the spot S.

The spot S, at which the light fluxes emitted from the light source lamp 110 converge, is offset from the second focal point P2 of the reflector 110A in a direction opposite to the direction in which the light emission center Q of the light emitting tube 110B is offset from the first focal point P2 of the reflector 110A.

The parallelizing lens 116 is formed from a concave lens whose optical axis is positioned on the reference axis L. The parallelizing lens 116 is disposed on the side of the region to be lighted by the light source lamp 110 and designed to parallelize the illumination light from the reflector 110A. The reference axis L is offset in a direction opposite to a direction where the light emission center Q of the light emitting tube 110B is offset from the reflector central axis OC (specifically, the reference axis L is offset downwardly in a virtual plane perpendicular to the reflector central axis OC). The offset value of the reference axis L from the reflector central axis OC is set at an offset value a (shown in FIG. 2) such that the light flux released from the reflector 110A and converged at the spot S enters the parallelizing lens 116.

When an optical distance from a point O, at which the ellipsoid of the reflecting surface 110A1 of the reflector 110A and the reflector central axis OC cross each other, to the first focal point P1, is a first focus distance f1 and an optical distance from the point O to the second focal point P2 is a second focus distance f2, the ratio of the offset value a of the reference axis L from the reflector central axis OC to the offset value b of the light emission center Q of the light emitting tube 110B from the reflector central axis OC, i.e., the a/b ratio is set at a value equal to the f2/f1 ratio.

The first lens array 120, the second lens array 130, the polarizing conversion element 140 and the superposing lens 150 are each disposed based on the reference axis L.

Since the reference axis L, as the central axis of the light flux in the optical path after the light source lamp 110, is offset from a reflector central axis OC, a region A, positioned in a direction opposite to a direction where the reference axis L is offset from the reflector central axis OC, is larger than a region B, positioned in the direction where the reference axis L is offset from the reflector central axis OC in a virtual cylindrical space extending parallel to the reference axis L from the end of the opening of the reflector 110A.

In the lighting unit 100 and a projector 1, including the lighting unit 100 of the first exemplary embodiment having the above structure, the reference axis L, as the central axis of the light flux in the optical path after the light source lamp 110, is offset from the reflector central axis OC. Since the respective optical elements in the optical path after the parallelizing lens 116 (such as the parallelizing lens 116, the lens arrays 120 and 130, the polarizing conversion element 140, the superposing lens 150, the color separation optical system 200, the relay optical system 300, the optical unit 400 and the cross dichroic prism 500) are disposed offset in the region positioned in the direction where the reference axis L is offset from the reflector central axis OC, the region A, positioned in a direction opposite to a direction where the reference axis L is offset from the reflector central axis OC, becomes a large space in the virtual cylindrical space extending parallel to the reference axis L from the end of the opening of the reflector 110A.

Accordingly, a circuit board, a power source and other relatively large components can be disposed adequately and efficiently in the large space of the region A, allowing the entire structure of the projector to be made thinner with ease.

In the lighting unit 100 and the projector 1, including the lighting unit 100 of the first exemplary embodiment, it is necessary to determine the offset value a of the reference axis L from the reflector central axis OC and the offset value b of the light emission center Q of the light emitting tube 110B from the reflector central axis OC considering the accommodation efficiency of the relatively large components, such as a circuit board and a power source and other components. Since the ratio of the offset value a of the reference axis L from the reflector central axis OC to the offset value b of the light emission center Q of the light emitting tube 110B from the reflector central axis OC, i.e., the a/b ratio is established according to the f2/f1 ratio (f2: second focus distance; f1: first focus distance), these parameters can be easily determined and thus the system design can be simplified.

Additionally, the lens arrays 120 and 130 and the polarizing conversion element 140 are disposed in such positions that the acquisition efficiency of the light reflected by the reflector becomes the highest. As a result, in the lighting unit 100 in which the light emitting tube 110B and the parallelizing lens 116 are offset in the direction perpendicular to the reflector central axis OC, the utilization efficiency of the illumination light can be increased to the highest.

Next, a second exemplary embodiment according to the present invention is hereinafter described with reference to FIG. 3.

Exemplary Embodiment 2

Figure 3:
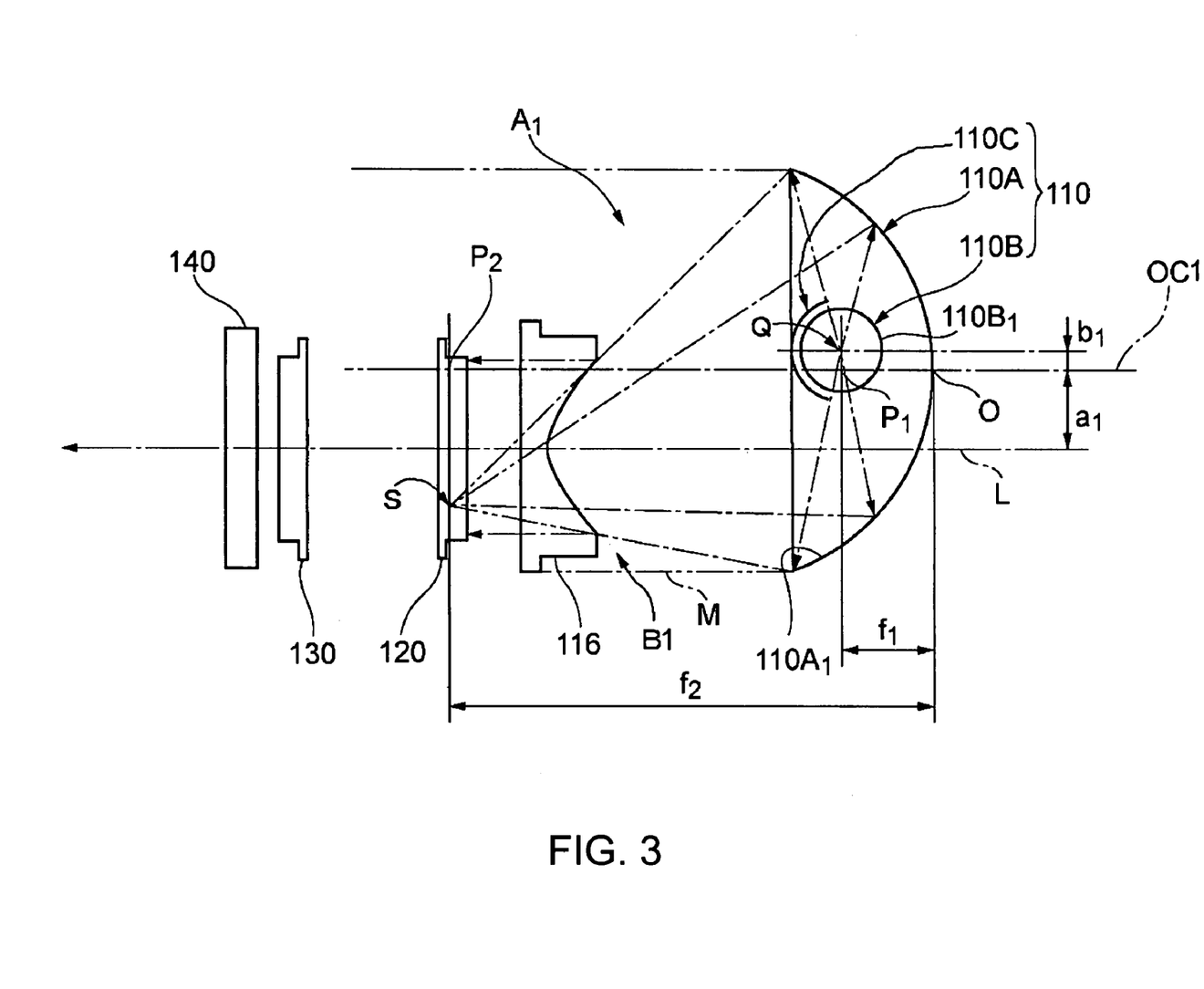
FIG. 3 is a schematic showing a lighting unit in a second exemplary embodiment according to the invention.

FIG. 3 is a schematic illustrating a lighting unit 410 in the second exemplary embodiment according to the present invention. In FIG. 3, identical reference numerals are given to identical components to those shown in FIG. 2, and detailed descriptions in connection therewith are omitted.

The lighting unit 410 shown in the second exemplary embodiment includes a lower end, as an end portion of the reflector 110A, positioned in a direction opposite to a direction where the light emission center Q is offset from a reflector central axis OC1 and a lower end, as an end portion of the parallelizing lens 116, positioned in the same direction and disposed in the same virtual line M parallel to the reflector central axis OC1.

The light emitting tube 110B is accommodated in the reflector 110A in the same manner as in the first exemplary embodiment. The light emitting tube 110B contains the first focal point P1 within the glass tube 110B1, and the light emission center Q of the light emitting tube 110B is disposed in such a position as to be offset from the first focal point P1 of the reflector 110 upwardly in a virtual plane perpendicular to the reflector central axis OC1. The offset value of the light emission center Q of the light emitting tube 110B from the reflector central axis OC1 in the vertical direction is set at b1 (b1>b) as shown in FIG. 3.

The parallelizing lens 116 is formed from a concave lens having an optical axis on the reference axis L. The parallelizing lens 116 is disposed on the side of the region to be lighted by the light source lamp 110, and is designed to parallelize the illumination light from the reflector 110A. The reference axis L is disposed in the direction opposite to the direction where the light emission center Q of the light emitting tube 110B is offset from the reflector central axis OC1 (i.e., downwardly in a virtual plane perpendicular to the reflector central axis OC1). The offset value of the reference axis L from the reflector central axis OC1 is set at a1 (a1>a) such that the light flux released from the reflector 110A and converged at the spot S can enter the parallelizing lens 116 as illustrated in FIG. 3. As a result, a region A1 positioned in the direction opposite to the direction where the reference axis L is offset from the reflector central axis OC1 in a virtual cylindrical space extending parallel to the reference axis L from the end of the opening of the reflector 110A becomes larger than the region A in the first exemplary embodiment.

When the optical distance from the point O at which the ellipsoid of the reflecting surface 110A1 of the reflector 110A and the reflector central axis OC1 cross each other to the first focal point P1 is the first focus distance f1 and the optical distance from the point O to the second focal point P2 is the second focus distance f2, the ratio of the offset value a1 of the reference axis L from the reflector central axis OC1 to the offset value b1 of the light emission center Q of the light emitting tube 110B from the reflector central axis OC1, i.e., the a1/b1 ratio is set at a value equal to the f2/f1 ratio.

Accordingly, the ratio of the offset value a1 of the reference axis L from the reflector central axis OC1 to the offset value b1 of the light emission center Q of the light emitting tube 110B from the reflector central axis OC1, i.e., a1/b1 is established according to the predetermined f2/f1 ratio. In this exemplary embodiment, the offset value b1 of the light emission center Q of the light emitting tube 110B from the reflector central axis OC1 is thus determined in association with the determined offset value a1 of the reference axis L from the reflector central axis OC1 such that the lower end of the reflector 110A and the lower end of the parallelizing lens 116 are positioned in the same virtual line M parallel to the reflector central axis OC1. As a result, the system design can be simplified in the same manner as in the first exemplary embodiment.

In the projector 1 in the second exemplary embodiment having the above structure, the lower end of the reflector 110A and the lower end of the parallelizing lens 116 are disposed in the same virtual line M parallel to the reflector central axis OC1. Thus, by further reducing the space of a region B1, positioned in a direction where the reference axis L is offset from the reflector central axis OC1 in a virtual cylindrical space extending parallel to the reference axis L from the end of the opening of the reflector 110A, the region A1, positioned in a direction opposite to a direction where the reference axis L is offset from the reflector central axis OC1, becomes still larger. Thus, relatively large components, such as a circuit board, a power source and a cooling fan can be most adequately and efficiently in the large region A1, allowing the projector to be made further thinner.

A third exemplary embodiment according to the present invention is now described with reference to FIGS. 4(a) and 4(b).

Exemplary Embodiment 3

Figure 4A:
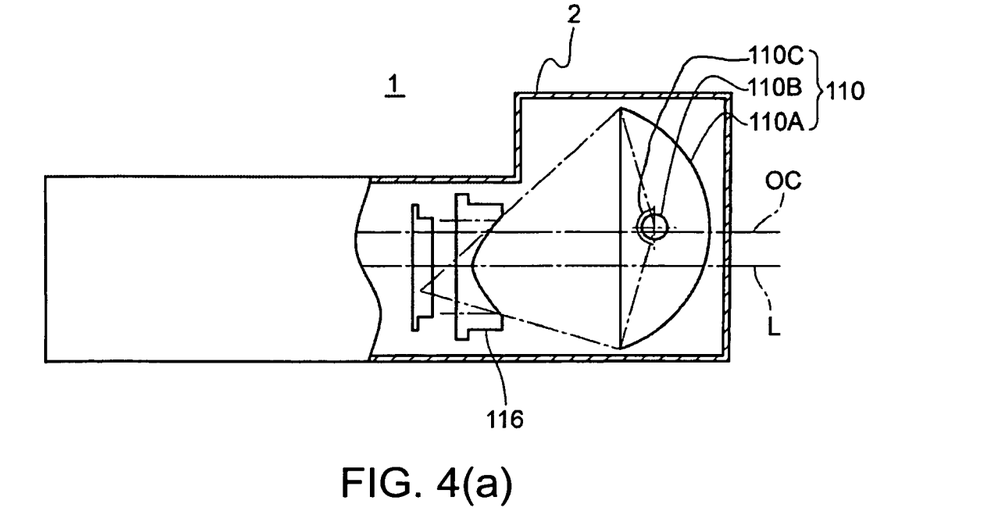
FIGS. 4(a) and 4(b) are schematics illustrating an optical component housing in a third exemplary embodiment according to the invention.
Figure 4B:
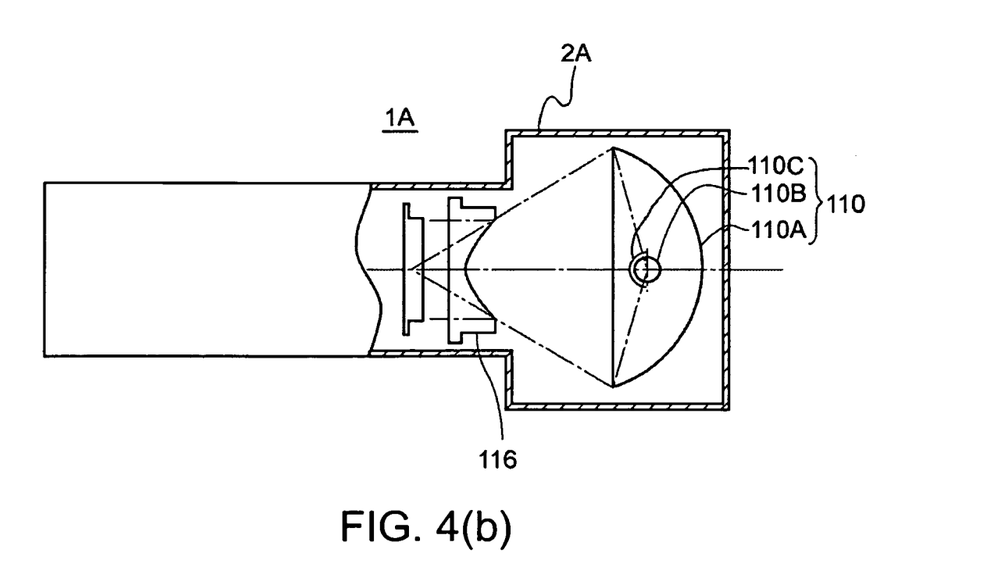

FIGS. 4(a) and 4(b) are schematics illustrating an optical component housing in the third exemplary embodiment according to the present invention. FIG. 4 (a) is a partial cross-sectional view showing an optical component housing of the projector 1 in the third exemplary embodiment as viewed from its side, while FIG. 4(b) is a partial cross-sectional view showing an optical component housing of a projector 1A used as a comparison example as viewed from its side.

In an optical system disposed within the optical component housing of the projector 1 in the third exemplary embodiment as illustrated in FIG. 4(a), the light emitting tube 110B contains the first focal point P1, which is one of the two focal points positioned inside and outside the ellipsoid reflector 110A, i.e., the first and the second focal points P1 and P2 and is located on the side of the reflecting surface of the reflector, within the glass tube 110B1 in the same manner as in the first or the second exemplary embodiment. The light emitting tube 110B is offset upwardly in a virtual plane perpendicular to the reflector central axis OC. The parallelizing lens 116 is offset in the direction opposite to the direction where the light emission center Q of the light emitting tube 110B is offset from the reflector central axis OC (i.e., the downward direction), and is disposed in such a position that the optical axis of the parallelizing lens 116 coincides with the reference axis L parallel to the reflector central axis OC. Thus, the respective optical elements of the projector 1 after the parallelizing lens 116 in the third exemplary embodiment are disposed offset in the region positioned in the direction opposite to the direction where the light emission center Q of the light emitting tube 110B is offset from the reflector central axis OC of the lighting unit 100 within the optical component housing.

Therefore, when the optical component housing is made thin to the limit, the bottom of the optical component housing can be made flat, as apparent from the comparison between the optical component housing in the exemplary embodiment and that of the comparison example shown in FIG. 4(b). This structure provides excellent installation stability and allows other relatively large components, such as a circuit board, a power source and a cooling fan, to be disposed adequately and efficiently. Thus, the outer housing of the projector can be made thin and the appearance of the projector can be enhanced.

In the respective exemplary embodiments, the positions of the light emission center Q of the light emitting tube 110B and the reference axis L upon which the dispositions of the respective optical systems in the optical path after the parallelizing lens 116 are based are offset in the upward/downward direction perpendicular to the reflector central axis OC or OC1. However, the present invention is not limited to this structure, and the light emission center Q and the reference axis L may be offset in the leftward/rightward direction horizontal to the reflector central axis OC or OC1. When the light emission center Q of the light emitting tube 110B is offset in the leftward direction horizontal to the reflector central axis OC or the OC1, the reference axis L coinciding with the optical axis of the parallelizing lens 116 is offset in the rightward direction horizontal to the reflector central axis OC or OC1. Conversely, when the light emission center Q of the light emitting tube 110B is offset in the rightward direction horizontal to the reflector central axis OC or OC1, the reference axis L coinciding with the optical axis of the parallelizing lens 116 is offset in the leftward direction horizontal to the reflector central axis OC or OC1.

Specifically, the only requirements are that the light emission center Q of the light emitting tube 110B is offset from the first focal point P1 in a virtual plane perpendicular to the reflector central axis OC or OC1, and that the reference axis L coinciding with the lens optical axis (optical axis) of the parallelizing lens 116 is offset from the reflector central axis OC or OC1 in the direction opposite to the direction where the light emission center Q is offset from the first focal point P1.

In this case, sufficiently large space can be obtained in a single region in any of the leftward/rightward directions horizontal to the reflector central axis OC or OC1 as well as in the upward/downward direction perpendicular to the reflector central axis OC or OC1. Thus, relatively large components, such as a circuit board and a power source, can be disposed adequately and efficiently in this space, providing the advantage that the projector can be made further compact.

The horizontal direction refers to a planar direction of the projector 1, whereas the vertical (perpendicular) direction refers to a thickness direction of the projector 1 in the exemplary embodiments.

For example, an exemplary aspect of the present invention may be adopted in the lighting unit including the subsidiary reflecting mirror 110C in the light source lamp 110 in the above-described exemplary embodiments, but the invention may be employed in a lighting unit of another type including a light source lamp having no subsidiary reflecting mirror.

In the preceding exemplary embodiments, only the example of the projector 1 including the three liquid crystal displays 400R, 400G and 400B, but the invention may be incorporated in a projector having only one liquid crystal display, a projector having two liquid crystal displays, or a projector having four or more liquid crystal displays.

In the preceding exemplary embodiments, the liquid crystal display employed is a transmission type having the light incidence surface and the light emission surface separately, but a reflecting type liquid crystal display having a common surface for light incidence and emission may be employed.

In the preceding exemplary embodiments, the lighting unit of an exemplary aspect of the invention is adopted in the projector 1 containing the liquid crystal displays 400R, 400G and 400B. But the light source unit of an exemplary aspect of the invention may be incorporated in a projector equipped with a light modulation unit using a micro-mirror. In this case, the polarizing plates at the incidence-side of the light flux and the emission-side of the light flux are not required.

In the preceding exemplary embodiments, only the example of the front-type projector which projects images from the side where the screen is viewed, but the invention may be adopted in a rear-type projector which projects images from the side opposite to the side where the screen is viewed.

In the preceding exemplary embodiments, the lighting unit of the invention is employed in the projector, but may be incorporated in other optical units.

Structures and other aspects of the invention may be different from the specific structures and configurations adopted in the above-described exemplary embodiments.

The invention claimed is:

1. A lighting unit, comprising:
   a light source lamp having a light emitting tube to emit illumination light and an ellipsoid reflector to reflect the illumination light emitted from the light emitting tube to release the illumination light in a fixed direction; and
   a parallelizing lens disposed on a side of a region to be lighted by the light source lamp to parallelize the illumination light released from the reflector,
   the reflector including a first focal point positioned inside a reflecting surface of the reflector, a second focal point positioned outside the reflecting surface of the reflector, and a reflector central axis on which the first and second focal points are positioned;
   the light emitting tube containing the first focal point within the light emitting tube, and a light emission center of the light emitting tube being offset from the first focal point in a virtual plane perpendicular to the reflector central axis;
   the parallelizing lens including a lens optical axis parallel to the reflector central axis, and the lens optical axis being offset from the reflector central axis in a direction opposite to a direction where the light emission center of the light emitting tube is offset from the first focal point of the reflector.

2. The lighting unit as set forth in claim 1,
   a ratio of an offset value a of the lens optical axis of the parallelizing lens, from the reflector central axis to an offset value b of the light emission center of the light emitting tube from the reflector central axis, i.e., an a/b ratio, being established so as to be equal to a ratio of an optical distance f2 from a point at which the reflector ellipsoid and the reflector central axis cross each other to the second focal point to an optical distance f1 from the point to the first focal point, i.e., a f2/f1 ratio.

3. The lighting unit as set forth in claim 1,
   an end of the reflector and an end of the parallelizing lens, positioned in a direction opposite to a direction where the light emission center of the light emitting tube is offset from the first focal point of the reflector, being disposed on the same virtual line parallel to the reflector central axis.

4. The lighting unit as set forth in claim 1,
the light emission center of the light emitting tube and the lens optical axis of the parallelizing lens being offset in an up-down direction perpendicular to the reflector central axis.

5. The lighting unit as set forth in claim 1,
the light emission center of the light emitting tube and the lens optical axis of the parallelizing lens being offset in a left-right direction horizontal to the reflector central axis.

6. A projector which modulates illumination light emitted from a lighting unit in accordance with image information to form optical images and projects the enlarged images,
the lighting unit being a lighting unit as set forth in claim 1.

7. The projector as set forth in claim 6,
optical components in an optical path after the parallelizing lens being disposed in such positions that an acquisition efficiency of the light reflected by the reflector becomes the highest.

8. A projector as set forth in claim 6,
a ratio of an offset value a of the lens optical axis of the parallelizing lens from the reflector central axis to an offset value b of the light emission center of the light emitting tube from the reflector central axis, i.e., an a/b ratio is established so as to be equal to a ratio of an optical distance f2 from a point at which the reflector ellipsoid and the reflector central axis cross each other to the second focal point to an optical distance f1 of the point to the first focal point, i.e., a f2/f1.

9. A projector as set forth in claim 6,
an end of the reflector and an end of the parallelizing lens, positioned in a direction opposite to a direction where the light emission center of the light emitting tube is offset from the first focal point of the reflector, being disposed in the same virtual line parallel to the reflector central axis.

10. A projector as set forth in claim 6,
the light emission center of the light emitting tube and the lens optical axis of the parallelizing lens being offset in an up-down direction perpendicular to the reflector central axis.

11. The projector as set forth in claim 6,
the light emission center of the light emitting tube and the lens optical axis of the parallelizing lens being offset in a left-right direction horizontal to the reflector central axis.

* * * * *